Patented June 25, 1940

2,205,408

UNITED STATES PATENT OFFICE 2,205,408

FLUORESCENT HYDROCARBON OIL

Heinrich Hopff and Hans Schoenherr, Ludwigshafen-on-the-Rhine, Germany, assignors to General Aniline & Film Corporation, a corporation of Delaware No Drawing. Original application August 9, 1938, Serial No. 223,828. Divided and this application May 29, 1939, Serial No. 276,447. In Germany August 26, 1937

5 Claims. (Cl. 87—9)

The present invention relates to fluorescent hydrocarbon oils.

This application has been divided out from our copending application Ser. No. 223,828, filed August 9, 1938.

We have found that the condensation products obtained by heating cyclic ketones containing at least four condensed nuclei with an anhydrous halide of zinc, aluminium or beryllium are particularly suitable for coloring mineral oil and hydrocarbon type solvents imparting thereto a reddish to greenish fluoresence.

As examples of ketones of the said kind there may be mentioned benzanthrone, anthanthrone, dibenzpyrenequinone, pyrenequinone and their chloro or amino derivatives. They are heated together with the catalysts preferably up to the boiling point of the mixture. The melt thus obtained is decomposed with water and after boiling, for example with dilute hydrochloric acid, purified in the usual manner, as for example by separate distillation, crystallization or extraction by means of solvents.

Aromatic or hydroaromatic hydrocarbons are preferably used as diluents in order to avoid decomposition. They may, in some cases, also take part in the formation of the dyestuff. By way of example there may be mentioned xylenes, naphthalene, alkylated naphthalenes, dibenzyl, diphenyl, alkyldiphenylenes, tetra- and decahydronaphthalene and their derivatives, as for example trichlorbenzene and chlorinated decahydronaphthalene.

The new products are dark colored flours or pastes, which are soluble in hydrocarbons, fats, oils and waxes giving a yellow, red or brown coloration and a faintly reddish to greenish fluorescence.

The following examples will further illustrate how the said invention may be carried out in practice but the invention is not restricted to these examples. The parts are by weight unless stated otherwise.

Example 1

Equal parts of diphenyl, benzanthrone and anhydrous aluminium chloride are quickly heated to boiling, whereby diphenyl is distilled off partly and the temperature rises to 230° C. After about 10 minutes the hot mass is poured into ice-water, the mixture is extracted with benzene, the solution is washed with dilute hydrochloric acid, then with water and finally dried with calcium chloride. After distilling off the benzene and the unchanged diphenyl a brittle mass remains which dissolves in organic solvents, for example in benzene or in mineral oils giving a dark carmine red coloration and a dark blue-green fluorescence.

The brittle mass may also be taken up with some benzene (about 10 times its amount) and the dyestuff precipitated with the equal volume of gasoline. The precipitate dissolves in high boiling organic solvents, especially in paraffins and mineral oils such as lubricating oil giving a strong dark red coloration and a pale bluish fluorescence. In the solution consisting of benzene and gasoline there remains a body, the coloration of which is pale carmine red and the fluorescence is very powerful green.

Example 2

A mixture of 1 part of benzanthrone and 8 parts of 1.3.5-trichlorbenzene is heated while stirring at 150° C. for half an hour while adding 1 part of anhydrous aluminium chloride. Then the reaction mixture is decomposed with ice water, trichlorbenzene is blown off with steam and the residue is taken up with benzene. After washing thoroughly the benzene solution with water it is dried and distilled. The dark residue is soluble in mineral oils giving a yellow-green coloration and a bright green fluorescence.

Example 3

1 part of benzanthrone is melted with 8 parts of diphenyl; then 1 part of molten zinc chloride is added. The whole is heated for an hour to boiling vigorously. After cooling a yellow-grey product is obtained which is capable of being pulverized. It dissolves in benzene giving a deep red coloration and a very strong green fluorescence. In order to remove the zinc chloride the solution is thoroughly washed with water and dried. After distilling off the benzene a residue remains which is especially well soluble in high boiling organic solvents.

Example 4

2 parts of anhydrous aluminium chloride are added in small parts while stirring to a hot mixture of 1 part of chlorbenzanthrone and 6 parts of diphenyl. Then the reaction mixture is heated to boiling for half an hour and worked up according to the manner described in Example 1. The product obtained is soluble in benzene giving a brown-red coloration and a reddish fluorescence.

Example 5

1 part of chlorbenzanthrone is dissolved in 10 parts of warm chlordecahydronaphthalene and 2 parts of anhydrous aluminium chloride are added at once to the solution. A vigorous reaction takes place whereby large amounts of hydrogen chloride escape. After cooling the product is pulverized; it is nearly insoluble in all solvents. By shaking for a longer space of time in a mixture of benzene and water it dissolves, however, in benzene, giving a deep red coloration and a dull green fluorescence. After distilling off the benzene the product is obtained in the form of a black powder.

*Example 6*

A mixture of 1 part of chlorbenzanthrone, 10 parts of decahydronaphthalene and 2 parts of anhydrous aluminium chloride is heated slowly to boiling. After an hour the mixture is allowed to cool, poured while still warm into 10 times its amount of xylene and shaken several times vigorously with hot water. Then the solvents are removed by steam distillation. Thus a dark product is obtained which may be redissolved once more with benzene, if desired. The solution of this product shows a very strong brown-red coloration.

*Example 7*

If, under otherwise unchanged conditions in Example 6 instead of decahydronaphthalene, 1,3,5-trichlorbenzene is used as solvent and the mixture is worked up in the same way, a product is obtained showing a deep dark green coloration if dissolved in mineral oils.

*Example 8*

1 part of aminobenzanthrone is dissolved in 10 parts of warm 1,3,5-trichlorbenzene and 2 parts of anhydrous aluminium chloride are added to the solution. The mixture becomes dark and after boiling for an hour under reflux its coloration changes to violet. After adding water to the body thus formed, a product is obtained which is soluble in low boiling organic solvents with a brilliant carmine red coloration.

*Example 9*

1 part of dibenzpyrenequinone is melted with 5 parts of diphenyl and 1 part of anhydrous aluminium chloride is added thereto. At first, the coloration of the reaction mixture is red, on further heating it changes to dark violet. Heating to boiling is continued for a quarter of an hour and hot water is added to the mixture. The product thus obtained is soluble in organic solvents and shows an intensely dark green fluorescence; the coloration is slightly yellow.

*Example 10*

If in the starting mixture of Example 9 dibenzyl is used instead of diphenyl, the coloration of the resulting product is yellow-orange; its fluorescence in organic solvents is pale yellow-green.

*Example 11*

2 parts of anhydrous aluminium chloride are added to a solution of 1 part of dibenzpyrenequinone in 10 parts of warm chlordecahydronaphthalene. A product is formed which may be difficultly decomposed with water. Its solution in mineral oils has an olive-green fluorescence and a deep red coloration.

*Example 12*

A melt of a part of dibenzpyrenequinone and 7.5 parts of dibenzyl is heated to vigorously boiling while adding 2.5 parts of anhydrous beryllium chloride, until a sample shows the formation of substances giving fluorescence. After about 2 hours the whole is allowed to cool, water is added to the compact product, and the mixture is extracted with benzene. A product is thus obtained which is soluble, giving a brown-red coloration and an intensely pale-green fluorescence.

*Example 13*

A melt of 1 part of anthanthrone, 10 parts of diphenyl and 2 parts of anhydrous aluminium chloride is heated to boiling for a quarter of an hour. The color of the reaction mixture changes from dark red over pale red to dark violet. After decomposing the hot mixture with water, there may be recovered with benzene, xylene or other similar solvents from the aqueous mixture a yellow compound giving a strong yellow-green fluorescence in hydrocarbons.

*Example 14*

A melt of 1 part of anthanthrone, 10 parts of alphamethylnaphthalene and 2 parts of anhydrous beryllium chloride is boiled for an hour. The cold viscous mixture is made up with xylene and then stirred into hot water. The xylene is blown off by means of steam and the residue is taken up with benzene. After distilling off the benzene a dark brown body remains which is soluble in organic solvents giving a deep red coloration and a red-violet fluorescence.

A similar product is obtained if pyrenequinone is employed as starting material. It dissolves in benzene giving a red-brown coloration and a brownish fluorescence.

What we claim is:

1. A fluorescent composition of matter comprising a hydrocarbon oil and a small percentage of a fluorescence-exhibiting condensation product obtained by heating an aromatic ketone having at least four condensed rings with an anhydrous halide of a metal selected from the group of zinc, beryllium and aluminium.

2. A fluorescent composition of matter comprising a hydrocarbon oil and a small percentage of a fluorescence-exhibiting condensation product obtained by heating an aromatic ketone having at least four condensed rings with an anhydrous halide of a metal selected from the group consisting of zinc, beryllium and aluminium in the presence of an organic solvent boiling above about 150° C. selected from the class consisting of cyclic hydrocarbons and halogenated cyclic hydrocarbons.

3. A fluorescent composition of matter comprising a hydrocarbon oil and a small percentage of a fluorescence-exhibiting condensation product obtained by heating benzanthrone with anhydrous aluminium chloride in the presence of diphenyl.

4. A fluorescent composition of matter comprising a hydrocarbon oil and a small percentage of a fluorescence-exhibiting condensation product obtained by heating benzanthrone with anhydrous zinc chloride in the presence of diphenyl.

5. A fluorescent composition of matter comprising a hydrocarbon oil and a small percentage of a fluorescence-exhibiting condensation product obtained by heating dibenzpyrenequinone with anhydrous beryllium chloride in the presence of dibenzyl.

HEINRICH HOPFF.
HANS SCHOENHERR.